United States Patent
Tanaka et al.

(10) Patent No.: US 12,432,085 B2
(45) Date of Patent: Sep. 30, 2025

(54) INFORMATION PROCESSING METHOD, INFORMATION PROCESSING DEVICE, AND RECORDING MEDIUM

(71) Applicant: PANASONIC INTELLECTUAL PROPERTY MANAGEMENT CO., LTD., Osaka (JP)

(72) Inventors: Kotaro Tanaka, Hyogo (JP); Masaya Yamamoto, Kyoto (JP); Masashi Hitotsuya, Osaka (JP); Mitsuki Yamada, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 913 days.

(21) Appl. No.: 17/297,282

(22) PCT Filed: Jan. 23, 2020

(86) PCT No.: PCT/JP2020/002232
§ 371 (c)(1),
(2) Date: May 26, 2021

(87) PCT Pub. No.: WO2021/005815
PCT Pub. Date: Jan. 14, 2021

(65) Prior Publication Data
US 2021/0383450 A1    Dec. 9, 2021

(30) Foreign Application Priority Data
Jul. 8, 2019    (JP) ................ 2019-126791

(51) Int. Cl.
*H04L 12/28* (2006.01)
*D06F 34/28* (2020.01)
(Continued)

(52) U.S. Cl.
CPC ...... *H04L 12/2823* (2013.01); *H04L 12/2803* (2013.01); *H04L 12/2816* (2013.01);
(Continued)

(58) Field of Classification Search
None
See application file for complete search history.

(56) References Cited

U.S. PATENT DOCUMENTS

| | | | |
|---|---|---|---|
| 10,074,119 B2* | 9/2018 | Zamer | G06Q 30/0625 |
| 2002/0116703 A1* | 8/2002 | Terasaki | H04N 21/4751 725/105 |

(Continued)

FOREIGN PATENT DOCUMENTS

| | | | |
|---|---|---|---|
| DE | 102014207737 A1 * | 11/2015 | A47L 15/0063 |
| JP | 11-146991 | 6/1999 | |

(Continued)

OTHER PUBLICATIONS

International Search Report and Written Opinion issued on Mar. 17, 2020 in International (PCT) Application No. PCT/JP2020/002232; with partial English translation.

(Continued)

*Primary Examiner* — Thomas C Lee
*Assistant Examiner* — Anzuman Sharmin
(74) *Attorney, Agent, or Firm* — Rimon P.C.

(57) ABSTRACT

An information processing method includes: obtaining location information indicating an installation location of an appliance, and user information indicating a first user linked to the installation location; obtaining log information indicating an operation performed by the appliance, and receiver information indicating a second user that receives presentation information; determining, when detecting a change in a state of the first user by reference to the log information and determining that the first user does not match the second (Continued)

user, the presentation information to be presented to the second user in accordance with the change in the state; and outputting the presentation information determined.

12 Claims, 12 Drawing Sheets

(51) Int. Cl.
  *F24F 11/64* (2018.01)
  *G07C 3/00* (2006.01)
(52) U.S. Cl.
  CPC ............... *D06F 34/28* (2020.02); *F24F 11/64* (2018.01); *G07C 3/00* (2013.01)

(56) References Cited

U.S. PATENT DOCUMENTS

| | | | |
|---|---|---|---|
| 2014/0075328 A1 | 3/2014 | Hansen et al. | |
| 2015/0019981 A1* | 1/2015 | Petitt, Jr. | G06F 3/04842 |
| | | | 715/738 |
| 2015/0032505 A1 | 1/2015 | Kusukame et al. | |
| 2015/0127556 A1 | 5/2015 | Harada et al. | |
| 2015/0220998 A1* | 8/2015 | Futa | G06Q 30/0241 |
| | | | 705/14.66 |
| 2016/0026354 A1 | 1/2016 | McIntosh et al. | |
| 2016/0155152 A1* | 6/2016 | Isaacs | G06Q 30/0267 |
| | | | 705/14.53 |
| 2018/0367862 A1* | 12/2018 | Horii | H04N 21/25891 |

FOREIGN PATENT DOCUMENTS

| | | | |
|---|---|---|---|
| JP | 2015060382 A | * | 3/2015 |
| JP | 6452571 B2 | | 1/2019 |

OTHER PUBLICATIONS

Extended European Search Report dated Jul. 13, 2022 issued in the corresponding European Patent Application No. 20837906.5.

* cited by examiner

FIG. 2

| Date and time | Details of operation |
|---|---|
| 2019/03/01 17:00:00 | Pollen removal mode turned ON |
| 2019/03/02 07:00:00 | Pollen removal mode turned OFF |
| ... | ... |

| Installation location | User |
|---|---|
| Child room | Child |
| Study | Father |
| Living room | Father, mother, and child |
| Entrance hall | Father, mother, and child |
| ... | ... |

FIG. 4

| Appliance | Installation location | |
|---|---|---|
| Lighting device A | Child room | 22 |
| TV A | Child room | |
| Lighting device B | Study | |
| TV B | Study | |
| ... | ... | |

FIG. 5

| Appliance user | Receiving user | |
|---|---|---|
| Child | Father or mother | 23 |
| Mother | Mother | |
| Father | Father | |
| Grandmother | Mother | |
| Grandfather | Mother | |
| ... | ... | |

FIG. 7

| # | Appliance | Installation location | State of appliance | State of appliance user | Content | Receiving user |
|---|---|---|---|---|---|---|
| 1 | Air purifier | Child room | Pollen removal mode turned ON | Pollinosis | Masks for children | Father or mother |
| 2 | Air conditioner | Child room | Pollen removal mode turned ON | Pollinosis | Masks for children | Father or mother |
| 3 | Lighting device | Child room | Turned ON during night | Lack of sleep | Products for sound sleep | Father or mother |
| 4 | TV | Child room | Turned ON during night | Lack of sleep | Products for sound sleep | Father or mother |
| 5 | Lighting device | Study | Turned ON in daytime on holiday | Lack of exercise | Gym | Father |
| 6 | Personal computer | Study | Turned ON in daytime on holiday | Lack of exercise | Gym | Father |
| 7 | Lighting device | Living room | Turned ON during night | Infant crying at night | Infant formula | Mother |
|   | Microwave oven | Living room | Turned ON during night |   |   |   |
| ... | ... | ... | ... | ... | ... | ... |

FIG. 8

| # | Appliance | Installation location | State of appliance | State of appliance user | Content | Receiving user |
|---|---|---|---|---|---|---|
| 1 | Electric rice cooker | Kitchen of house of grandparents | Decrease in the number of uses of cooker | Consume less food | Meal delivery service | Mother |
| 2 | Refrigerator | Kitchen of house of grandparents | Decrease in the number of opening-closing times | Consume less food | Meal delivery service | Mother |
| 3 | Refrigerator | Kitchen of house of child living alone | Decrease in the number of opening-closing times | Not eat properly | Dietary supplement | Mother |
| 4 | ... | ... | ... | ... | ... | ... |

FIG. 9

| # | Appliance | Installation location | State of appliance | Appliance user | State of appliance user | Content | Receiving user |
|---|---|---|---|---|---|---|---|
| 1 | Lighting device | Study | ON | Father | — | — | — |
|   | Lighting device | Child room | ON | Child | — | — | — |
|   | TV | Living room | ON | Mother (determined) | Change in hobbies | Content tied to CM run during broadcast program | Mother |
| 2 | Air conditioner | Child room | Cooler turned ON | Child | — | — | — |
|   | Air conditioner | Study | Cooler turned ON | Father | — | — | — |
|   | Air conditioner | Living room | Cooler turned ON | Mother (determined) | Change in physical condition or constitution | Refreshing beverages | Mother |
| ... | ... | ... | ... | ... | ... | ... | ... |

FIG. 10

| # | Appliance | Installation location | State of appliance | Appliance user | State of appliance user | Content | Receiving user |
|---|---|---|---|---|---|---|---|
| 1 | Lighting device | Bedroom of father | ON | Father | Frequent urination | Medications for overactive bladder | Father |
|  | Lighting device | Toilet room | ON | Father (determined) |  |  |  |
|  | Toilet device | Toilet room | Flushed | Father (determined) |  |  |  |
| 2 | Lighting device | Entrance hall | ON | Child (determined) | Be home | Programs broadcast while at home | Father or mother |
|  | Lighting device | Child room | ON | Child |  |  |  |
|  | ... | ... | ... | ... | ... | ... | ... |

INFORMATION PROCESSING METHOD, INFORMATION PROCESSING DEVICE, AND RECORDING MEDIUM

CROSS-REFERENCE OF RELATED APPLICATIONS

This application is the U.S. National Phase under 35 U.S.C. § 371 of International Patent Application No. PCT/JP2020/002232, filed on Jan. 23, 2020, which in turn claims the benefit of Japanese Application No. 2019-126791, filed on Jul. 8, 2019, the entire disclosures of which Applications are incorporated by reference herein.

TECHNICAL FIELD

The present disclosure relates to an information processing method, an information processing device, and a recording medium.

BACKGROUND ART

A technology for enabling easy presentation of home-appliance information to a user of an information terminal is known (see Patent Literature [PTL] 1).

CITATION LIST

Patent Literature

[PTL 1] Japanese Unexamined Patent Application Publication No. 11-146991

SUMMARY OF INVENTION

Technical Problem

Unfortunately, although the technology disclosed in PTL 1 presents operation information of a home appliance, this presented information is not always appropriate for a user.

In view of this, the present disclosure provides an information processing method and so forth that present information appropriate for a user.

Solution to Problem

In accordance with an aspect of the present disclosure, the information processing method includes: obtaining location information indicating an installation location of an appliance, and user information indicating a first user linked to the installation location; obtaining log information indicating an operation performed by the appliance, and receiver information indicating a second user that receives presentation information; determining, when detecting a change in a state of the first user by reference to the log information and determining that the first user does not match the second user, the presentation information to be presented to the second user in accordance with the change in the state; and outputting the presentation information determined.

Thus, the information processing method outputs the presentation information intended for the second user, on the basis of the change in the state of the first user detected from the operation of the appliance linked to the first user. This presentation information allows the second user to timely obtain information appropriate to the change in the state of the first user.

Moreover, the information processing method according to the present disclosure also has an effect of avoiding higher consumption of power or information processing resources.

It is possible that the change in the state of the first user is a predetermined change previously associated with a predetermined operation of the appliance.

Thus, the information processing method is capable of detecting the predetermined change in the state of the first user from an operation log of the appliance, in accordance with the correspondence relationship. This reduces an amount of processing for detecting the change in the state of the first user.

It is also possible that the appliance comprises a plurality of appliances, and the detecting the change in the state of the first user is performed by reference to the log information of the plurality of appliances Thus, the information processing method is capable of detecting the predetermined change in the state of the first user from operation logs of the plurality of appliances. This enables high-accuracy detection of the change in the state of the first user.

It is further possible that the location information includes information of an installation space, the plurality of appliances include: a private appliance that is used by a single user and installed in a private space; and a shared appliance that is used by a plurality of users and installed in a shared space, and the information processing method further comprises: detecting a change in a state of a third user other than the single user linked to the private space among the plurality of users linked to the shared space, by reference to the log information of the shared appliance and the log information of the private appliance that correspond to a same period; and determining, when the third user does not match the second user, the presentation information to be presented to the second user in accordance with the change detected in the state of the third user.

Thus, if the plurality of appliances include a shared appliance and a private appliance, the information processing method is capable of detecting a predetermined change in the state of the third user from an operation log of the shared appliance. Through the use of the operation log of the shared appliance linked to the plurality of users together with the log of the private appliance, the change in the state of the user who is linked only to the shared appliance can also be detected.

It is still further possible that the appliance comprises a plurality of appliances, and the information processing method comprises, when detecting, by reference to the log information of the plurality of appliances, that the plurality of appliances are turned on, determining the first user and detecting the change in the state of the first user, by reference to the location information of the plurality of appliances and sequence information indicating a sequence of operations performed by the plurality of appliances.

Thus, the information processing method is capable of determining the first user and detecting the predetermined change in the state of the first user on the basis the locations and sequence of operations of the plurality of appliances. The use of the logs of the plurality of appliances enables determination of the first user and detection of the change in the state with high accuracy, in accordance with a route followed.

It is still further possible that the location information includes information of an installation space, the plurality of appliances include: a private appliance that is used by a single user and installed in a private space; and a shared appliance that is used by a plurality of users and installed in a shared space, and the single user of the private appliance included in the sequence information is the first user.

Thus, the information processing method is capable of determining the first user and detecting the predetermined change in the state of the first user, in accordance with the sequence of operations of the plurality of appliances including the shared appliance and the private appliance. Through the use of the operation log of the shared appliance linked to the plurality of users together with the log of the private appliance, the information processing method is capable of determining the first user and detecting the change in the state of the first user with high accuracy in accordance with a route followed.

It is still further possible that the presentation information is selected from among at least one piece of information previously prepared, in accordance with attribute information on an attribute of the second user.

Thus, the information processing method is capable of presenting the second user with the presentation information that is suited, or relatively highly suited, to the attribute of the second user. More specifically, the method is capable of presenting the information that is suited, or relatively highly suited, to the second user.

It is still further possible that the second user owns a terminal that is capable of purchase processing, and the purchase processing is information processing performed in response to an operation performed by a user to purchase a product or service in accordance with the presentation information outputted.

Thus, the information processing method outputs the information related to purchase of a product or service for instance, to the second user who owns the terminal capable of the purchase processing. This leads to a purchase action more easily. Therefore, the information processing method is capable of presenting the appropriate information related to purchase of a product or service for instance, in such a manner to further encourage purchase of the product or service.

It is still further possible that when the first user does not own the terminal that is capable of the purchase processing, the second user does not match the first user.

Thus, if the first user is, for example, a minor or an elderly person who does not own a terminal capable of the purchase processing, the information processing method outputs the information related to purchase of a product or service for instance, to a user, such as an adult or a proxy, who owns the terminal capable of the purchase processing. Therefore, the information processing method is capable of presenting the appropriate information related to purchase of a product or service for instance, in such a manner to further encourage purchase of the product or service.

It is still further possible that the appliance is at least one of a light fixture, an air conditioner, a television receiver, an electrical cooking appliance, a washing machine, a cleaner, an electronic lock, and a recorder.

Thus, the information processing method is capable of more easily presenting the appropriate information related to purchase of a product or service for instance, by reference to an operation log of at least one of the light fixture, the air conditioner, the television receiver, the electrical cooking appliance, the washing machine, the cleaner, the electronic lock, and the recorder.

In accordance with another aspect of the present disclosure, an information processing device includes: an obtainer that obtains log information indicating an operation performed by an appliance; a detector that obtains: location information indicating an installation location of the appliance; user information indicating a first user linked to the installation location; and receiver information indicating a second user that receives presentation information, and detects a change in a state of the first user by reference to the log information; and a presentation controller that, when the detector detects the change in the state of the first user by reference to the log information and the first user does not match the second user, determines the presentation information to be presented to the second user in accordance with the change in the state, and outputs the presentation information determined.

This achieves the same advantageous effect as the information processing method described above.

In accordance with still another aspect of the present disclosure, a non-transitory computer-readable recording medium is embodied with a computer program, and the computer program causes a computer to execute the information processing method described above.

This achieves the same advantageous effect as the information processing method described above.

Advantageous Effects of Invention

The information processing method according to the present disclosure is capable of presenting appropriate information related to purchase of a product or service for instance.

BRIEF DESCRIPTION OF DRAWINGS

FIG. 2 illustrates an example of log information of an appliance according to Embodiment.

FIG. 3 illustrates an example of user information according to Embodiment.

FIG. 4 illustrates an example of location information according to Embodiment.

FIG. 5 illustrates an example of receiver information according to Embodiment.

FIG. 7 illustrates a first example of a correspondence relationship among log information, content, and receiver, according to Embodiment.

FIG. 8 illustrates a second example of the correspondence relationship among log information, content, and receiver, according to Embodiment.

FIG. 9 illustrates a third example of the correspondence relationship among log information, content, and receiver, according to Embodiment.

FIG. 10 illustrates a fourth example of the correspondence relationship among log information, content, and receiver, according to Embodiment.

Figure 1:
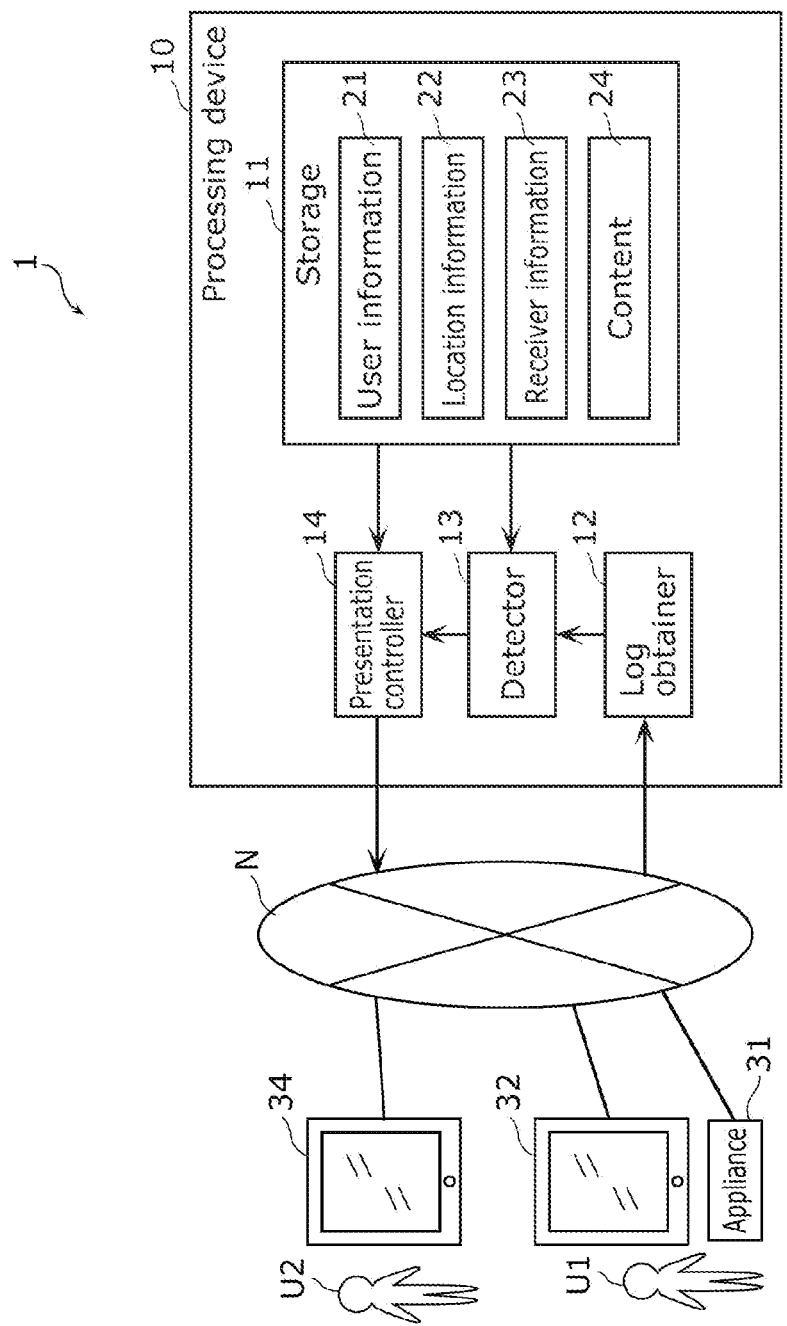
FIG. 1 illustrates a configuration of an information processing system according to Embodiment.

DESCRIPTION OF EMBODIMENTS (Underlying Knowledge Forming Basis of the Present Disclosure)

A study has been made on a technology of collecting logs as an operation history of an appliance, presuming a state of a user from the logs, and recommending a product appropriate to the state of the user. For example, if an air purifier placed in a child room becomes often used in a pollen removal mode that is different from a mode that has been used, user A linked to the child room may have symptoms of pollinosis. In this case, even if a product like a mask used against pollinosis is recommended just because user A is linked to the child room, user A may be a child and have no purchasing ability. Thus, such recommendation may be ineffective and end in failure in terms of product promotion.

In response to this issue, a knowledge was gained. To be more specific, recommendation may be given to user B different from user A and having purchasing ability, in accordance with the state of the user presumed from the log of the appliance. As a result, intended information is to be presented to an intended user. This knowledge leads to conception of various aspects described below.

Hereafter, Embodiment is described in detail with reference to the drawing as appropriate. Note that overly detailed description may be omitted. For example, detailed description on a well-known matter or redundant description on the substantially same structural components may be eliminated. This can keep the following description from being overly redundant and thus allows those skilled in the art to easily understand.

The inventor(s) provides the accompanying drawings and the following description for those skilled in the art to fully understand the present disclosure, and thus does not intend to use these drawings and the description to limit the subject matter described in claims.

Hereafter, a background of the present disclosure and an issue to be solved by the present disclosure are first described in detail. Then, description on Embodiment follows.

Embodiment describes an information processing system and so forth that present appropriate information related to purchase of a product or service for instance.

FIG. 1 illustrates a configuration of information processing system 1 according to Embodiment.

As illustrated in FIG. 1, information processing system 1 includes processing device 10, appliance 31, and terminals 32 and 34. Processing device 10, appliance 31, and terminals 32 and 34 are connected via network N for intercommunication.

Processing device 10 is an information processing device that presents appropriate information related to purchase of a product or service for instance. Processing device 10 obtains, from appliance 31, an operation log of appliance 31. Then, processing device 10 transmits, to terminal 32 or 34, content determined by performing processing based on the obtained log. A user to whom the content is to be presented is also referred to as a receiving user or a second user. The information processing performed by processing device 10 is described in detail later.

Appliance 31 operates with electric power. Appliance 31 is assumed to be used by, or for, user U1 (also referred to as a first user). User U1 or another user starts or ends an operation of appliance 31 and sets an operation mode, for example.

Appliance 31 generates a log that is information indicating an operation performed by appliance 31, and then provides this log to processing device 10. Appliance 31 includes a storage device and a communication interface (not shown). Appliance 31 temporarily stores the generated log in the storage device and provides this log to processing device 10 via the communication interface and network N. Here, the method of providing the log of appliance 31 to processing device 10 is not limited to this. For example, the log stored by appliance 31 may be copied by a transportable storage device into another information appliance (such as a personal computer or a smartphone), and this information appliance may provide the log to processing device 10 via network N.

Appliance 31 is assumed to be installed and used in a space (also referred to as an installation location), such as a room or aisle in a house. This installation location is linked to a single user or a plurality of users. A user linked to the installation location of appliance 31 (that is, user U1) is also referred to as an appliance user. Appliance 31 is at least one of a light fixture, an air conditioner, a television receiver (also referred to as a TV), an electrical cooking appliance, a washing machine, a cleaner, an electronic lock, and a recorder, for example. A space linked to a single user is referred to as a private space whereas a space linked to a plurality of users is referred to as a shared space. Appliance 31 installed in a private space is referred as private appliance whereas appliance 31 installed in a shared space is referred to as a shared appliance.

Terminal 32 is an information terminal that displays information. Specific examples of this terminal include a personal computer, a smartphone, and a tablet computer. Terminal 32 is assumed to be owned by user U1.

Terminal 32 includes a communication interface (not shown), and is connected to processing device 10 via the communication interface and network N for intercommunication. Terminal 32 receives content from processing device 10, and displays the received content on a display screen.

Moreover, terminal 32 is capable of purchase processing in response to an operation performed by user U1. The purchase processing refers to information processing performed to purchase a product or service, for example.

Terminal 34 is an information terminal that displays information and is similar to terminal 32 as a piece of hardware. Terminal 34 is owned by user U2 different from user U1 of appliance 31, and thus operates independently of terminal 32. Moreover, terminal 34 is capable of purchase processing in response to an operation performed by user U2.

Network N may include a local area network of, for example, a home or an office, a mobile carrier network, and the Internet.

Processing device 10 may transmit content intended for user U1 to terminal 32, and may transmit content intended for user U2 to terminal 34. In other words, the receiving user may be user U1 or user U2.

If user U1 owns terminal 32 that is capable of the purchase processing, processing device 10 transmits content intended for user U1 to terminal 32. More specifically, the user who owns terminal 32 capable of the purchase processing refers to a person, such as an adult, who is able to purchase a product or service.

On the other hand, if user U1 does not own terminal 32 that is capable of the purchase processing, processing device 10 transmits content intended for user U2 to terminal 34. In this case, the receiving user (i.e., user U2) does not match the appliance user (i.e., user U1). More specifically, the user who does not own terminal 32 capable of the purchase processing refers to a person, such as a minor or an elderly person, who is not allowed, or determined as having substantially no ability, to sign an agreement to purchase a product or service for instance.

In this case, user U2 is assumed to be related to user U1. More specifically, user U2 is assumed to be relatively close to user U1 in a personal or economic relationship, such as a family member or a relative. Suppose in particular that user U1 has no ability, or a relatively low ability, to purchase a product or service, that is, suppose that user U1 is a minor like a child or an elderly person. In this case, user U2 is assumed to be a parent or proxy of this minor, or a child of this elderly person.

If the receiving user does not match user U1, the receiving user and user U1 may be in different locations. For example, the receiving user may be in a house different from a house of user U1. This corresponds to a case where terminal 34 is located in a house different from a house where appliance 31 is located.

Next, processing device 10 is described.

As illustrated in FIG. 1, processing device 10 includes storage 11, log obtainer 12, detector 13, and presentation controller 14. Each of log obtainer 12, detector 13, and presentation controller 14 may be implemented by a processor that executes a program stored in a memory.

Storage 11 is a storage device that stores various kinds of information. More specifically, storage 11 stores user information 21, location information 22, receiver information 23, and content 24. Details of these pieces of information are described later.

Log obtainer 12 is a processor that obtains a log of appliance 31. Log obtainer 12 uses a communication interface (not shown) to obtain the log from appliance 31 via network N. Log obtainer 12 provides the obtained log of appliance 31 to detector 13.

Detector 13 is a processor that detects a change in a state of user U1. Detector 13 obtains the log of appliance 31 from log obtainer 12, and obtains user information 21 and location information 22 from storage 11. Then, detector 13 presumes and thereby detects a change in the state of user U1 by reference to the log obtained, user information 21 obtained, and location information 22 obtained.

More specifically, detector 13 detects the change in the state of user U1 by determining that appliance 31 performs an operation previously associated with a predetermined change in the state of user U1, by reference to the log information. Detector 13 may determine that appliance 31 performs an operation (a change in operation) previously associated with a predetermined change in the state of user U1, by reference to the log information of one appliance 31. Alternatively, detector 13 may determine that a plurality of appliances 31 perform operations previously associated with a predetermined change in the state of user U1, by reference to the log information of the plurality of appliances 31. An example is described later for each of these cases.

For example, suppose that appliance 31 is an air conditioner or air purifier installed in a child room. In this case, if obtaining a log indicating that appliance 31 operates in a pollen removal mode, detector 13 detects, as a change, that a child who is user U1 linked to this appliance 31 has symptoms of pollinosis.

Presentation controller 14 is a processor that controls content presentation to the receiving user. If detector 13 detects a change in the state of user U1, presentation controller 14 determines content that is to be presented to user U1 or user U2.

If detector 13 detects a change in the state of user U1 and user U1 matches the receiving user, or more specifically, the receiving user is user U1, presentation controller 14 determines content that is to be presented to user U1 in accordance with the change in the state. In contrast, if detector 13 detects a change in the state of user U1 and user U1 does not match the receiving user, or more specifically, the receiving user is user U2, presentation controller 14 determines content that is to be presented to user U2 in accordance with the change in the state. Here, the content is information content used to transfer information of some kind. One example of content is an advertisement to encourage purchase of a product or service. This case is described as follows. Note that content may announce an event or promote sign-up for a predetermined group, for example.

For content determination, presentation controller 14 selects content to be presented from among at least one content previously prepared, in accordance with attribute information related to an attribute of the receiving user. To be more specific, the attribute information includes hobbies, age, gender, place of residence, income, marital status, the number of children, occupation, and educational background, for example.

Moreover, presentation controller 14 outputs the determined content. To be more specific, presentation controller 14 transmits data of content (such as text data or image data) to the terminal of the receiving user, that is, terminal 32 of user U1 or terminal 34 of user U2, via network N. User U1 or user U2 is assumed to view the content displayed on a corresponding one of terminal 32 and terminal 34.

Hereinafter, information used in the processing performed by processing device 10 is described.

FIG. 2 illustrates an example of the log information of appliance 31 according to Embodiment. As illustrated in FIG. 2, the log information includes at least one entry that includes a date and time and details of an operation performed by appliance 31.

"Date and time" refers to a date and time when appliance 31 performs an operation related to the entry. "Details of operation" refers to details of the operation related to the entry.

For example, the log information illustrated in FIG. 2 is about an air purifier. A first entry illustrated in FIG. 2 indicates that the air purifier starts an operation (i.e., is turned on) in the pollen removal mode on the date and time "2019/3/01 17:00:00".

Moreover, a second entry illustrated in FIG. 2 indicates that the air purifier ends the operation (i.e., is turned off) in the pollen removal mode on the date and time "2019/3/02 07:00:00".

Note that the log information may include, in addition to the above, identification information of appliance 31 that is a transmission source of this log information.

The log information is transmitted by appliance 31 and received by log obtainer 12. When receiving the log information, log obtainer 12 provides, to detector 13, the log information together with the identification information of appliance 31 that is the transmission source of this log information. If the log information does not include the identification information of appliance 31, the identification information of appliance 31 may be obtained by reference to a transmission source address attached to the received log information.

FIG. 3 illustrates an example of user information 21 according to Embodiment. User information 21 indicates, for each installation location, a user linked to the installation location.

For example, user information 21 illustrated in FIG. 3 indicates that: an installation location described as "Child room" is linked to "Child"; and an installation location described as "Study" is linked to "Father". Each of "Child room" and "Study" is linked to a single user and thus a private space.

Moreover, this user information indicates that an installation location described as "Living room" is linked to three users, that is, father, mother, and child. "Living room" is linked to a plurality of users and thus a shared space.

User information 21 is predetermined for each of at least one installation location and stored in storage 11. Moreover, user information 21 is read and used by detector 13 to determine user U1 in accordance with the installation location of appliance 31.

FIG. 4 illustrates an example of location information 22 according to Embodiment. Location information 22 indicates a location in which appliance 31 is installed. One entry corresponds to one appliance 31.

For example, location information 22 illustrated in FIG. 4 indicates that: each of installation locations of lighting device A and TV A is the child room; and each of installation locations of lighting device B and TV B is the study.

Location information 22 is provided for each of at least one appliance 31 and stored in storage 11. If the installation location of appliance 31 is changed by user U1 for instance, location information 22 is assumed be updated to indicate the updated installation location. Moreover, location information 22 is read and used by detector 13 to determine the installation location of appliance 31 in accordance with appliance 31 that is the transmission source of the log.

FIG. 5 illustrates an example of receiver information 23 according to Embodiment. Receiver information 23 indicates a receiving user to whom the content is to be presented in the case of a change in the state of user U1.

For example, receiver information 23 illustrated in FIG. 5 indicates that if the state of the child changes, a receiver of content to be presented is the father or mother of the child. To be more specific, this information indicates that if user U1 is a child, the receiving user is user U2, that is, the father or mother of the child.

Moreover, this information indicates that if the state of the mother or father changes, a receiver of content to be presented is this identical person, that is, the mother or father. To be more specific, this information indicates that if user U1 is the mother or father, the receiving user is user U2, that is, this identical person (i.e., user U1).

Furthermore, this information indicates that if a state of a grandmother or grandfather changes, a receiver of content to be presented is the mother who is a child of the grandmother or grandfather. To be more specific, if user U1 is the grandmother or grandfather, the receiving user is user U2, that is, the mother who is the child of the grandmother or grandfather.

Receiver information 23 is predetermined for each of at least one user U1 and stored in storage 11. Moreover, if detector 13 detects a change in the state of user U1, presentation controller 14 uses this information to determine a receiver of content.

Figure 6:
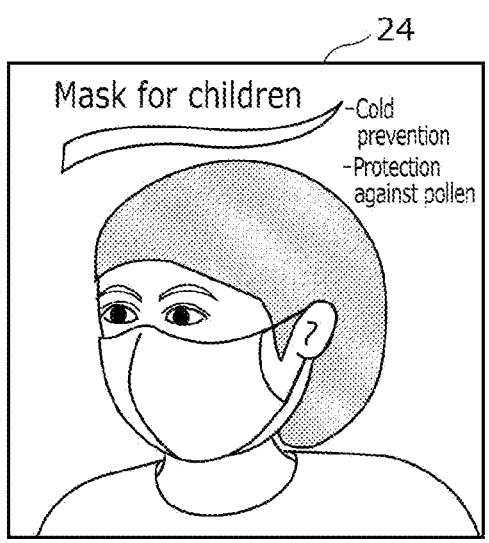
FIG. 6 illustrates an example of content according to Embodiment.

FIG. 6 illustrate an example of content 24 according to Embodiment.

The example of content 24 illustrated in FIG. 6 is an image of advertisement that encourages purchase of masks for children. This image is displayed on the display screen of terminal 32 if detector 13 detects that the child has symptoms of pollinosis, for example. Content 24 may include not only the image encouraging purchase of masks for children, but also an image encouraging purchase of any product or service. Moreover, the image may include a still image or video as well as various items, such as pictures, letters, or patterns.

FIG. 7 illustrates a first example of a correspondence relationship among log information, content, and receiver, according to Embodiment. The correspondence relationship illustrated in FIG. 7 is used by presentation controller 14 to determine content and a receiver of the content if detector 13 detects a change in the state of user U1 in accordance with an operation of appliance 31.

In an example illustrated in entry #1 in FIG. 7, on the basis that the air purifier in the child room is turned on in the pollen removal mode, detector 13 detects that user U1, the child, has symptoms of pollinosis. In this case, presentation controller 14 presents content of advertisement for masks for children to terminal 34 of user U2, that is, the father or mother of the child. In this example, detector 13 determines, by reference to the log information of one appliance 31, that appliance 31 performs an operation previously associated with a predetermined change in the state of the user.

In this case, detector 13 may detect that user U1 has symptoms of pollinosis on the basis not only simply that "the air purifier is turned on in the pollen removal mode", but also that the air purifier is turned on and off in the pollen removal mode for several days in a row or that the air purifier has been left on for several days in a row, for example.

In another example illustrated in entry #5 in FIG. 7, on the basis that the lighting device in the study is turned on in the daytime on a holiday, detector 13 detects that user U1, the father, lacks exercise. In this case, presentation controller 14 presents content of advertisement for a gym to terminal 32 of user U1, that is, the father.

In another example illustrated in entry #7 in FIG. 7, on the basis that the lighting device in the living room is turned on during the night and also a microwave oven is used during the night, detector 13 detects that an infant of user U1, the mother, cries at night. In this case, presentation controller 14 presents content of advertisement for infant formula to terminal 34 of user U1, that is, the mother. In this example, detector 13 determines that the plurality of appliances 31 perform operations previously associated with a predetermined change in the state of the user, by reference to the log information of the plurality of appliances 31.

FIG. 8 illustrates a second example of the correspondence relationship among log information, content, and receiver, according to Embodiment. The correspondence relationship illustrated in FIG. 8 is used by presentation controller 14 to determine content and a receiver of the content if detector 13 detects a change in the state of user U1 in accordance with an operation of appliance 31 in a different house.

In an example illustrated in entry #1 in FIG. 8, in accordance with the number of uses of an electric rice cooker in a kitchen of a different house, a house of grandparents, has decreased as compared with the past, detector 13 detects that users U1, the grandparents, consume less food. In this case, presentation controller 14 presents content of advertisement for meal delivery service to terminal 34 of user U2, that is, the mother (who is the child of these grandparents).

In another example illustrated in entry #3 in FIG. 8, on the basis that the number of times a refrigerator in a kitchen of a child living alone in a different house is opened and closed has decreased as compared with the past, detector 13 detects that user U1, the child, is not eating properly. In this case, presentation controller 14 presents content of advertisement for dietary supplement for children, to terminal 34 of user U2, that is, the mother (who is a parent of the child).

FIG. 9 illustrates a third example of the correspondence relationship among log information, content, and receiver, according to Embodiment. The correspondence relationship illustrated in FIG. 9 is used by presentation controller 14 to determine content and a receiver of the content if detector 13 detects a change in the state of the user in accordance with operations of a plurality of appliances 31 including a private appliance and a shared appliance.

In an example illustrated in entry #1 in FIG. 9, on the basis that the lighting device in the study, the lighting device in the child room, and the TV in the living room are turned on during the same period, detector 13 detects a change in hobbies of user U1, the mother. Here, a person who is watching the TV in the living room cannot be determined simply by reference to the log of the TV in the living room because the TV in the living room is a shared appliance. However, detector 13 determines that the father is in the study because the lighting device in the study is turned on while the TV in the living room is on. In addition, detector 13 determines that the child is in the child room because the lighting device in the child room is turned on while the TV in the living room is on. As a result, although the father, the mother, and the child are linked to the living room that is a shared space (see FIG. 3), detector 13 determines that user U1 in the living room is the mother instead of the father or the child. Then, in accordance with a channel on the TV or a broadcast program on this channel watched during this period, content tied to a commercial message (CM) run during this broadcast program is presented to terminal 32 of user U1, that is, the mother. In this example, detector 13 detects a change in the state of a user (corresponding to a third user) other than the users linked to the respective private spaces among a plurality of users linked to the shared space, by reference to the log information of the shared appliance and the log information of the private appliances. Here, detecting the change in the state of the third user includes both (a) determining that the shared appliance and the private appliances are turned on during the same period and (b) determining that the shared appliance performs an operation previously associated with a predetermined change in the state of the third user during the aforementioned period, by reference to the log information of the shared appliance.

In another example illustrated in entry #2 in FIG. 9, on the basis that cooling functions of the air conditioners in the study, child room, and living room are on during the same period, detector 13 detects a change in physical condition or constitution of user U1, the mother. Here, the method of determining the mother as being user U1 is the same as above. In this case, presentation controller 14 presents content of advertisement for refreshing beverages to terminal 32 of the mother.

FIG. 10 illustrates a fourth example of the correspondence relationship among log information, content, and receiver, according to Embodiment. The correspondence relationship illustrated in FIG. 10 is used by presentation controller 14 to determine content and a receiver of the content if detector 13 detects a change in the state of the user in accordance with operations and a predetermined sequence of these operations performed by the plurality of appliances 31.

In an example illustrated in entry #1 in FIG. 10, in accordance with a sequence of operations in which a lighting device in a bedroom of the father is turned on, then a lighting device in a toilet room is turned on, and then a toilet device is flushed, detector 13 detects that user U1, the father, has a tendency to frequent urination. Here, a person who is in the toilet room cannot be determined simply by reference to a log of the lighting device or toilet device in the toilet room because the toilet room is a shared space. However, in the sequence of operations, the lighting device in the father's bedroom that is a private space linked to the father is turned on, then the lighting device in the toilet room is turned on, and then the toilet device is flushed. Based on this sequence, the father is determined as being the person who turns on the lighting device in the toilet room and uses the toilet device. Thus, content of advertisement for medication for the treatment of the tendency to frequent urination (such as medications for overactive bladder) is presented to terminal 32 of user U1, the father. In this example, by reference to the log information of the plurality of appliances 31, detector 13 determines that the plurality of appliances 31 perform, in the predetermined sequence, the operations previously associated with a predetermined change in the state of user U1. Here, the plurality of appliances 31 include a private appliance and a shared appliance.

Hereinafter, processing performed by processing device 10 configured as above is described. The following sequentially describes (1) processing performed for outputting appropriate information to a user by using a private appliance and (2) processing performed for outputting appropriate information to a user by using a private appliance and a shared appliance.

Figure 11:
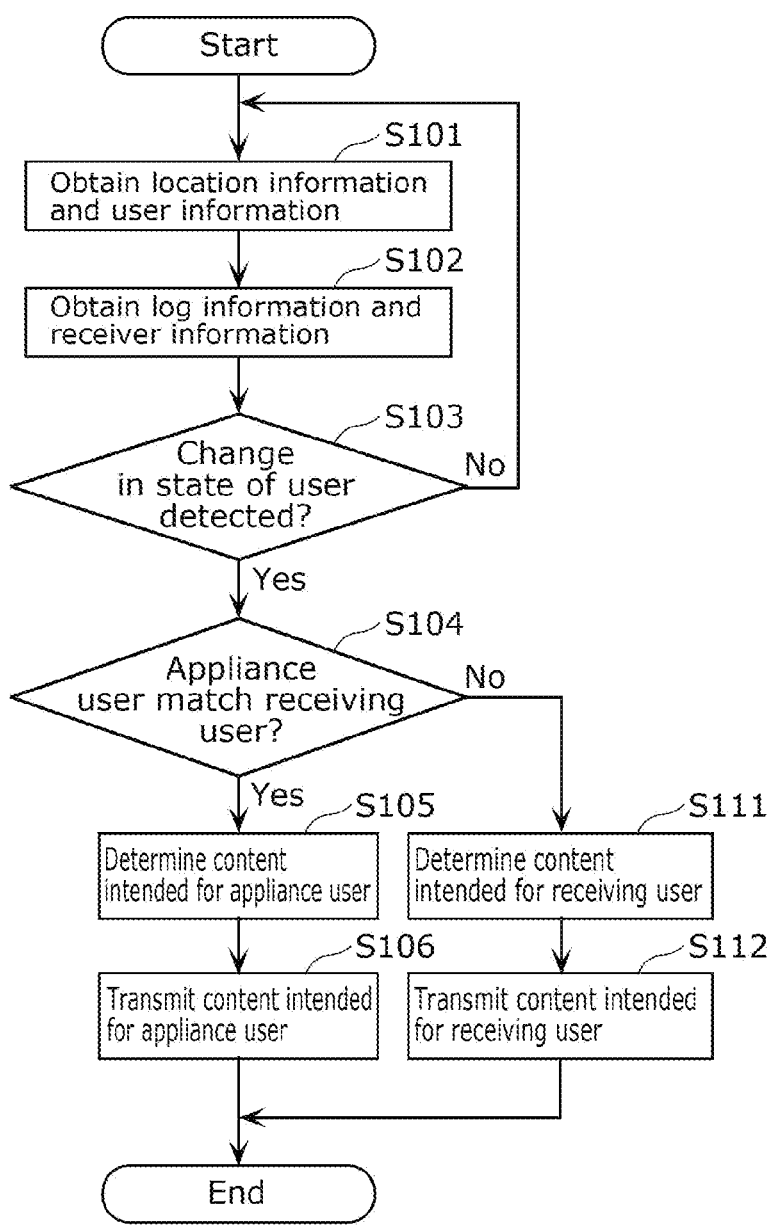
FIG. 11 is a flowchart illustrating a first example of processing performed by a processing device according to Embodiment.

(1) Processing Performed for Outputting Appropriate Information to a User by Using a Private Appliance FIG. 11 is a flowchart illustrating a first example of processing performed by processing device 10 according to Embodiment.

In Step S101, detector 13 obtains location information 22 and user information 21 by reading these pieces of information from storage 11.

In Step S102, log obtainer 12 obtains log information from appliance 31. Moreover, detector 13 obtains receiver information 23 by reading this information from storage 11.

In Step S103, detector 13 performs processing for detecting a change in the state of user U1 by reference to the log information obtained in Step S102. If detecting the change in the state of user U1 (Yes in Step S103), detector 13 proceeds to Step S104. Otherwise (No in Step S103), detector 13 executes Step S101 again.

In Step S104, presentation controller 14 determines whether user U1 matches the receiving user. If so (Yes in Step S104), presentation controller 14 proceeds to Step S105. Otherwise (No in Step S104), presentation controller 14 proceeds to Step S111.

In Step S105, presentation controller 14 determines content 24 intended for user U1 who is an appliance user.

In Step S106, presentation controller 14 transmits content 24 that is intended for user U1, namely the appliance user, and determined in Step S105 to terminal 32 of user U1. On completion of Step S106, a sequence of processes illustrated in FIG. 11 is ended.

In Step S111, presentation controller 14 determines content 24 intended for the receiving user, that is, user U2.

In Step S112, presentation controller 14 transmits content 24 that is intended for the receiving user, namely user U2, and determined in Step S111 to terminal 34 of the receiving user, namely user U2. On completion of Step S112, a sequence of processes illustrated in FIG. 11 is ended.

Figure 12:
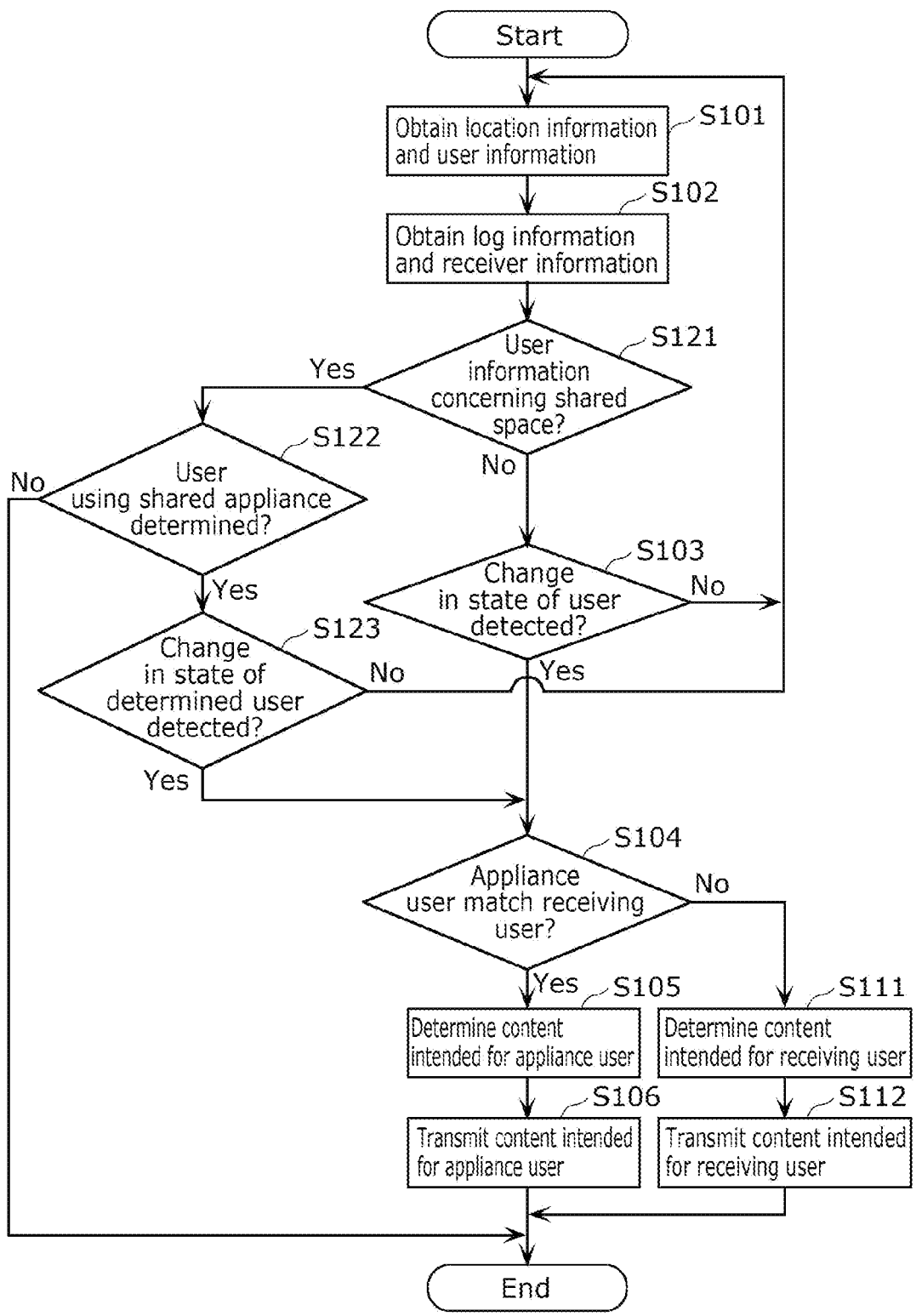
FIG. 12 is a flowchart illustrating a second example of processing performed by the processing device according to Embodiment.

(2) Processing Performed for Outputting Appropriate Information to a User by Using a Private Appliance and a Shared Appliance FIG. 12 is a flowchart illustrating a second example of the processing performed by processing device 10 according to Embodiment. Here, processes that are the same as those described above in (1) (see FIG. 11) are assigned the same step numbers as in FIG. 11 and detailed description on such processes may not be repeated.

After Steps S101 and S102, detector 13 executes Step S121 for each piece of user information 21 obtained.

In Step S121, detector 13 determines, for each piece of user information 21 obtained in Step S101, whether this piece of user information 21 is concerning a space linked to a plurality of users, or more specifically, concerning a shared space. If this piece of user information 21 is concerning a share space (Yes in Step S121), detector 13 proceeds to Step S122. Otherwise (No in Step S121), detector 13 proceeds to Step S103.

In Step S 122, detector 13 performs processing for determining the user who uses a shared appliance, and determines whether the user who uses the shared appliance is determined. If the user is determined, detector 13 proceeds to Step S123. Otherwise, detector ends a sequence of processes illustrated in FIG. 12. The processing for determining the user who uses the shared appliance is described in detail later.

In Step S123, detector 13 performs processing for detecting a change in the state of the user determined in Step S122. If detecting the change in the state of the user (Yes in Step S123), detector 13 proceeds to Step S104. Otherwise (No in Step S123), detector 13 executes Step S101 again.

Steps S102 to S106, S111, and S112 are the same as those in FIG. 11, and thus are omitted from description.

Figure 13:
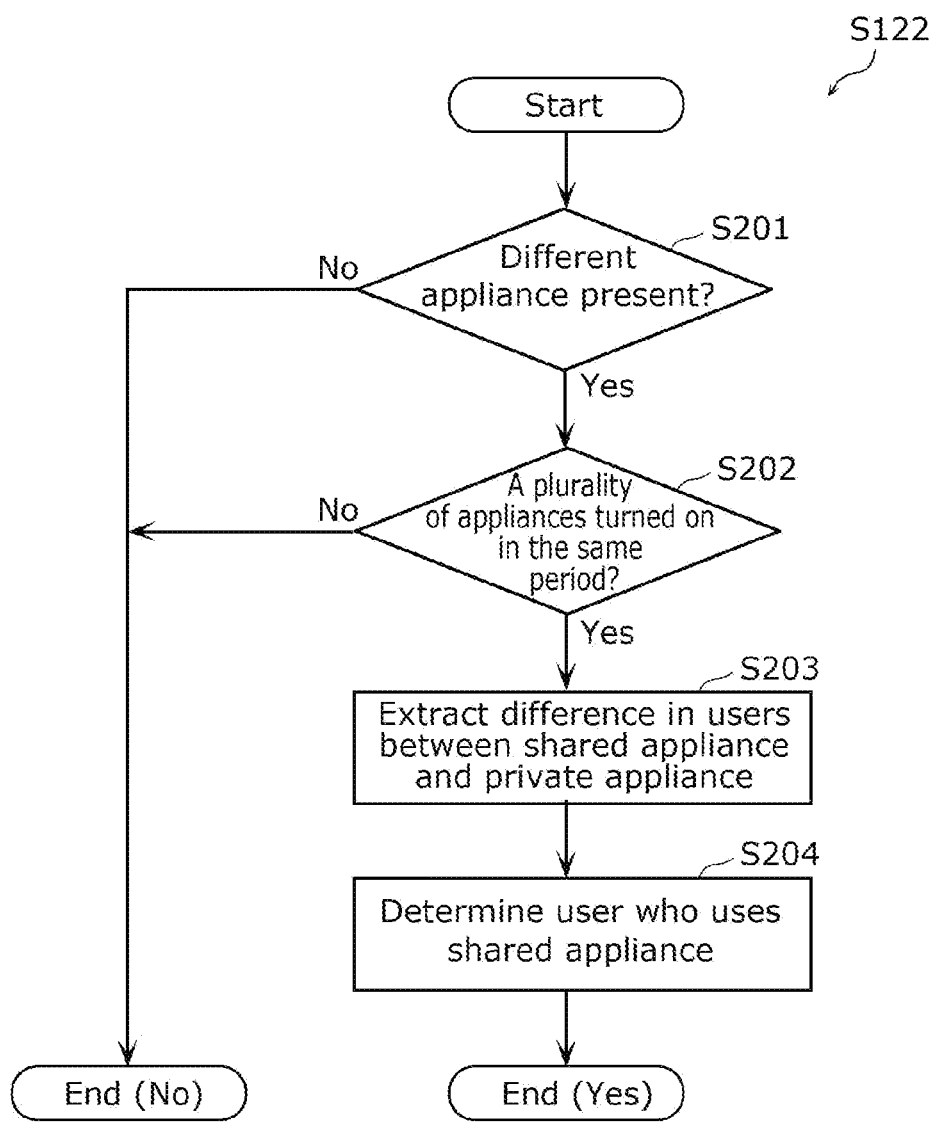
FIG. 13 is a flowchart illustrating detailed processing performed by the processing device according to Embodiment.

FIG. 13 is a flowchart illustrating detailed processing performed by processing device 10 according to Embodiment. The processing in FIG. 13 illustrates in detail the process in Step S122 of FIG. 12.

In Step S201, detector 13 determines whether different appliance 31 is present in addition to appliance 31 concerned, by reference to location information 22. If determining that different appliance 31 is present (Yes in Step S201), detector 13 proceeds to Step S202. Otherwise (No in Step S201), detector 13 ends a sequence of processes illustrated in FIG. 13. In this case, detector 13 returns to the original process (i.e., Step S122) with the result as "No", or more specifically, as "the user who uses the shared appliance cannot be determined".

In Step S202, detector 13 determines whether the plurality of appliances 31 are turned on in the same period, by reference to the log information obtained in Step S201. If determining that the plurality of appliances 31 are turned on in the same period (Yes in Step S202), detector 13 proceeds to Step S203. Otherwise (No in Step S202), detector 13 ends a sequence of processes illustrated in FIG. 13. In this case, detector 13 returns to the original process (i.e., Step S122) with the result as "No", or more specifically, as "the user who uses the shared appliance cannot be determined".

In Step S203, detector 13 determines a difference in users between the shared appliance and the private appliance.

In Step S204, detector 13 determines the user who uses the shared appliance, in accordance with the difference in the users determined in Step S203. In this case, detector 13 returns to the original process (i.e., Step S122) with the result as "Yes", or more specifically, as "the user who uses the shared appliance is determined".

Figure 14:
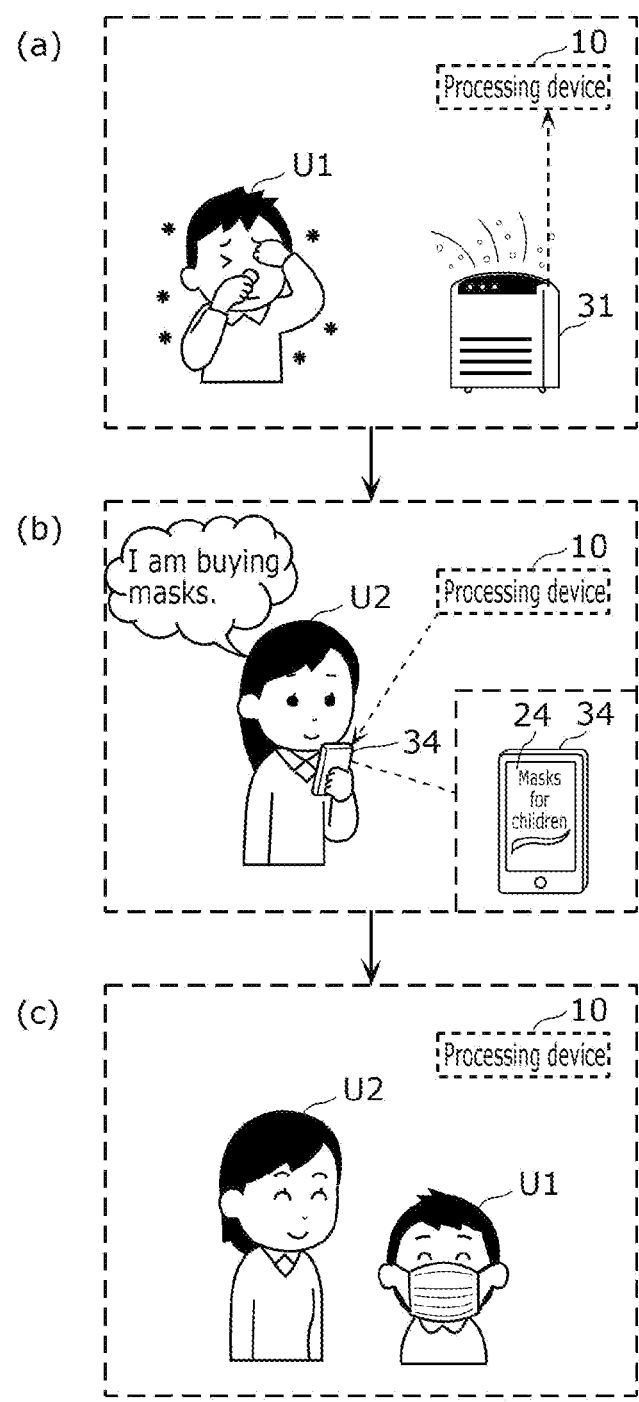
FIG. 14 illustrates situations in which the processing device is used, according to Embodiment.

FIG. 14 illustrates situations in which processing device 10 is used, according to Embodiment.

A situation illustrated in (a) of FIG. 14 indicates that an operation of appliance 31 is changed in accordance with a change in the state of user U1. For example, because user U1, the child, has a symptom, such as itchy eyes or a runny nose, appliance 31 that is the air purifier is turned on in the pollen removal mode by the child or the parent of this child. In this case, appliance 31 transmits, to processing device 10, a log indicating that the air purifier is turned on in the pollen removal mode. Here, user U1 who is the child does not own a terminal capable of the purchase processing.

A situation illustrated in (b) of FIG. 14 indicates that an image of advertisement for masks for children is displayed on terminal 34 of the mother who is user U2, that is, the receiving user. In this case, processing device 10 performs processing by reference to the log transmitted from appliance 31 in situation (a) described above. As a result of this processing, the advertisement for masks for children is determined and transmitted as content 24 to be presented to user U2. Viewing content 24 of the advertisement displayed on terminal 34, the mother decides to purchase these masks and operates terminal 34 to purchase the masks for children. The advertisement displayed on terminal 34 allows the mother to consider or remember purchase of the masks for children. Moreover, the purchase of the masks for children can be completed relatively simply only by an operation performed on the displayed advertisement.

A situation illustrated in (c) of FIG. 14 indicates that the masks for children purchased by the mother in situation (b) described above are delivered at home and that the child wears a mask.

As described above, processing device 10 achieves the sequence of processes up to the purchase of the masks for children by the mother, on the basis that the air purifier in the child room is turned on in the pollen removal mode. In this way, processing device 10 is capable of presenting the appropriate information related to purchase of a product or service for instance.

As described thus far, the information processing method according to Embodiment outputs presentation information intended for a second user, in accordance with a change in a state of a first user detected from an operation of an appliance linked to the first user. This presentation information allows the second user to timely obtain information appropriate to the change in the state of the first user. Moreover, the method also has an effect of avoiding higher consumption of power or information processing resources.

Moreover, the information processing method is capable of detecting the predetermined change in the state of the first user from an operation log of the appliance, in accordance with the correspondence relationship. This reduces an amount of processing for detecting the change in the state of the first user.

Furthermore, the information processing method is capable of detecting the predetermined change in the state of the first user from operation logs of the plurality of appliances. This enables high-accuracy detection of the change in the state of the first user.

Moreover, if the plurality of appliances include a shared appliance and a private appliance, the information processing method is capable of detecting a predetermined change in the state of the third user from an operation log of the shared appliance. Through the use of the operation log of the shared appliance linked to the plurality of users together with the log of the private appliance, the change in the state of the user who is linked only to the shared appliance can also be detected.

Furthermore, the information processing method is capable of determining the first user and detecting the predetermined change in the state of the first user on the basis the locations and sequence of operations of the plurality of appliances. The use of the logs of the plurality of appliances enables determination of the first user and detection of the change in the state with high accuracy, in accordance with a route followed.

Moreover, the information processing method is capable of determining the first user and detecting the predetermined change in the state of the first user, in accordance with the sequence of operations of the plurality of appliances including the shared appliance and the private appliance. Through the use of the operation log of the shared appliance linked to the plurality of users together with the log of the private appliance, the information processing method is capable of determining the first user and detecting the change in the state of the first user with high accuracy in accordance with a route followed.

Furthermore, the information processing method is capable of presenting the second user with the presentation information that is suited, or relatively highly suited, to the attribute of the second user. More specifically, the method is capable of presenting the information that is suited, or relatively highly suited, to the second user.

Moreover, the information processing method outputs the information related to purchase of a product or service for instance, to the second user who owns the terminal capable of the purchase processing. This leads to a purchase action more easily. Therefore, the information processing method is capable of presenting the appropriate information related to purchase of a product or service for instance, in such a manner to further encourage purchase of the product or service.

Furthermore, if the first user is, for example, a minor or an elderly person who does not own a terminal capable of the purchase processing, the information processing method outputs the information related to purchase of a product or service for instance, to a user, such as an adult or a proxy, who owns the terminal capable of the purchase processing. Therefore, the information processing method is capable of presenting the appropriate information related to purchase of a product or service for instance, in such a manner to further encourage purchase of the product or service.

Moreover, the information processing method is capable of more easily presenting the appropriate information related to purchase of a product or service for instance, by reference to an operation log of at least one of the light fixture, the air conditioner, the television receiver, the electrical cooking appliance, the washing machine, the cleaner, the electronic lock, and the recorder.

The information processing method according to Embodiment may be described as, but is not limited to, the following.

In other words, the information processing method according to Embodiment includes: obtaining location information indicating an installation location of an appliance, and user information indicating a first user linked to the installation location; obtaining log information indicating an operation performed by the appliance, and receiver information indicating a second user that receives presentation information; determining, when detecting a change in a state of the first user by reference to the log information and determining that the first user does not match the second user, the presentation information to be presented to the second user in accordance with the change in the state; and outputting the presentation information determined.

Thus, the information processing method outputs the presentation information intended for the second user, in accordance with the change in the state of the first user detected from the operation of the appliance linked to the first user. As a result, the second user views the presentation information that allows the second user to consider or remember purchase of a product or service. Moreover, a purchase procedure can be completed relatively simply by an operation performed on the presentation information. Therefore, the information processing method is capable of presenting the appropriate information related to purchase of a product or service for instance.

In the absence of the output of the aforementioned presentation information, the second user does not perform a purchase procedure related to a product or service at the aforementioned timing. Thus, the second user may have to consume more power or more information processing resources to perform the purchase procedure later. Here, the information processing method according to the present disclosure also has an effect of avoiding higher consumption of power or information processing resources.

Moreover, detecting the change in the state may include determining that the appliance performs an operation previously associated with a predetermined change in the state of the first user, by reference to the log information.

Thus, the information processing method is capable of detecting, by presuming from the operation log of the appliance, the predetermined change in the state of the first user in accordance with the correspondence relationship. Therefore, the information processing method is capable of more easily presenting the appropriate information related to purchase of a product or service for instance.

Furthermore, the appliance comprises a plurality of appliances. Detecting the change in the state may include determining that the plurality of appliances perform operations previously associated with a predetermined change in the state of the first user, by reference to the log information of the plurality of appliances.

Thus, the information processing method is capable of detecting, by presuming from the operation logs of the plurality of appliances, the predetermined change in the state of the first user in accordance with the correspondence relationship. Therefore, the information processing method is capable of more easily presenting the appropriate information related to purchase of a product or service for instance.

Moreover, the plurality of appliances include: a private appliance that is used by a single user and installed in a private space; and a shared appliance that is used by a plurality of users and installed in a shared space. The information processing method further includes: detecting a change in a state of a third user other than the single user linked to the private space among the plurality of users linked to the shared space, by reference to the log information of the shared appliance and the log information of the private appliance. Detecting the change in the state of the third user may include both (a) determining that the shared appliance and the private appliances are turned on during the same period and (b) determining that the shared appliance performs an operation previously associated with a predetermined change in the state of the third user during the aforementioned period, by reference to the log information of the shared appliance.

Thus, if the plurality of appliances include a shared appliance and a private appliance, the information processing method is capable of detecting, by presuming from the operation log of the shared appliance, a predetermined change in the state of the third user. Through the use of the operation log of the shared appliance linked to the plurality of users together with the log of the private appliance, the information processing method is capable of more easily presenting the appropriate information related to purchase of a product or service for instance.

Furthermore, the appliance comprises a plurality of appliances. Detecting the change in the state may include determining that the plurality of appliances perform, in the predetermined sequence, the operations previously associated with a predetermined change in the state of the first user by reference to the log information of the plurality of appliances.

Thus, the information processing method is capable of detecting the predetermined change in the state of the third user in accordance with the sequence of operations of the plurality of appliances. The use of the logs of the plurality of appliances enables the information processing method to more easily present the appropriate information related to purchase of a product or service for instance.

Moreover, the plurality of appliances include: a private appliance that is used by a single user and installed in a private space; and a shared appliance that is used by a plurality of users and installed in a shared space.

Thus, the information processing method is capable of detecting the predetermined change in the state of the third user in accordance with the sequence of operations of the plurality of appliances including the shared appliance and the private appliance. Therefore, through the use of the operation log of the shared appliance linked to the plurality of users together with the log of the private appliance, the information processing method is capable of more easily presenting the appropriate information related to purchase of a product or service for instance.

Furthermore, determining the presentation information may include selecting the presentation information from among at least one piece of information previously prepared, in accordance with attribute information on an attribute of the second user.

Thus, the information processing method is capable of presenting the second user with the presentation information that is suited, or relatively highly suited, to the attribute of the second user. Viewing of the presentation information that is suited, or relatively highly suited, to the second user allows the second user to more easily take action to purchase a product or service. Therefore, the information processing method is capable of presenting the appropriate information related to purchase of a product or service for instance.

Moreover, the second user may own a terminal that is capable of purchase processing. The purchase processing may be information processing performed in response to an operation performed by a user to purchase a product or service in accordance with the presentation information outputted.

Thus, the information processing method outputs the information related to purchase of a product or service for instance, to the second user who owns the terminal capable of the purchase processing. This leads to a purchase action more easily. Therefore, the information processing method is capable of presenting the appropriate information related to purchase of a product or service for instance, in such a manner to further encourage purchase of the product or service.

Furthermore, if the first user does not own the terminal that is capable of the purchase processing, the second user may not match the first user.

Thus, if the first user is, for example, a minor or an elderly person who does not own a terminal capable of the purchase processing, the information processing method outputs the information related to purchase of a product or service for instance, to a user, such as an adult or a proxy, who owns the terminal capable of the purchase processing. Therefore, the information processing method is capable of presenting the appropriate information related to purchase of a product or service for instance, in such a manner to further encourage purchase of the product or service.

Moreover, the appliance may be at least one of a light fixture, an air conditioner, a television receiver, an electrical cooking appliance, a washing machine, a cleaner, an electronic lock, and a recorder.

Thus, the information processing method is capable of more easily presenting the appropriate information related to purchase of a product or service for instance, by reference to an operation log of at least one of the light fixture, the air conditioner, the television receiver, the electrical cooking appliance, the washing machine, the cleaner, the electronic lock, and the recorder.

Embodiment has been described thus far as an example of the technology according to the present disclosure. To describe this example, the accompanying drawings and detailed description have been provided.

Thus, the structural components described in the accompanying drawings and the detailed description may include, not only structural components essential to solve the issue, but also structural components non-essential to solve the issue, in order to illustrate the above implementation example. On this account, these non-essential structural components should not be readily regarded as being essential only because these non-essential structural components are described in the accompanying drawings and the detailed description.

Moreover, Embodiment described above is an example of the technology according to the present disclosure. Thus, various changes, substitutions, additions, and omissions are allowed within the same scope or an equivalent scope of the following claims.

INDUSTRIAL APPLICABILITY

The present disclosure is applicable to, for example, a device that presents appropriate information related to purchase of a product or service for instance.

REFERENCE SIGNS LIST 1 information processing system
10 processing device
11 storage
12 log obtainer
13 detector
14 presentation controller
21 user information
22 location information
23 receiver information
24 content
31 appliance
32, 34 terminal
N network
U1, U2 user

The invention claimed is:
1. An information processing method, comprising:
obtaining location information indicating an installation location of an appliance, and user information indicating a first user linked to the installation location, wherein the appliance is used by or provided for the first user, and the first user owns or does not own a terminal capable of performing purchase processing, which is information processing for purchasing a product or service;

obtaining log information indicating an operation performed by the appliance, and receiver information indicating a second user that receives presentation information, wherein the second user owns a terminal capable of performing the purchase processing;

determining, as a result of detecting a change in a state of the first user by reference to the log information, whether or not the first user matches the second user;

when it is determined that the first user matches the second user, determining, as the presentation information, first presentation information to be presented to the first user in accordance with the change in the state, and outputting the first presentation information by transmitting the first presentation information to the terminal of the first user who is determined to match the second user, wherein the first presentation information includes a content that is previously associated with the change in the state and includes information encouraging the first user to purchase a product or service to be provided for the first user; and when it is determined that the first user does not match the second user, determining, as the presentation information, second presentation information to be presented to the second user in accordance with the change in the state; and outputting the second presentation information by transmitting the second presentation information to the terminal of the second user without transmitting the second presentation information to the first user, wherein the second presentation information includes a content that is previously associated with the change in the state and includes information encouraging the second user to purchase a product or service to be provided for the first user, wherein the product or the service is previously associated with the change in the state as a product or service that is provided in response to the state of the first user, and the appliance is installed and used in the installation location.

2. The information processing method according to claim 1, wherein the change in the state of the first user is a predetermined change previously associated with a predetermined operation of the appliance.

3. The information processing method according to claim 1, wherein the appliance comprises a plurality of appliances, and the detecting the change in the state of the first user is performed by reference to the log information of the plurality of appliances.

4. The information processing method according to claim 3, wherein the location information includes information of an installation space, the plurality of appliances include: a private appliance that is used by a single user and installed in a private space; and a shared appliance that is used by a plurality of users and installed in a shared space, and the information processing method further comprises:

detecting a change in a state of a third user other than the single user linked to the private space among the plurality of users linked to the shared space, by reference to the log information of the shared appliance and the log information of the private appliance that correspond to a same period; and determining, as a result of determining that the third user does not match the second user, the presentation information to be presented to the second user in accordance with the change detected in the state of the third user.

5. The information processing method according to claim 1, wherein the appliance comprises a plurality of appliances, and the information processing method comprises:

as a result of detecting, by reference to the log information of the plurality of appliances, that the plurality of appliances are turned on, determining the first user and detecting the change in the state of the first user, by reference to the location information of the plurality of appliances and sequence information indicating a sequence of operations performed by the plurality of appliances.

6. The information processing method according to claim 5, wherein the location information includes information of an installation space, the plurality of appliances include: a private appliance that is used by a single user and installed in a private space; and a shared appliance that is used by a plurality of users and installed in a shared space, and the single user of the private appliance included in the sequence information is the first user.

7. The information processing method according to claim 1, wherein the presentation information is selected from among at least one piece of information previously prepared, in accordance with attribute information on an attribute of the second user.

8. The information processing method according to claim 1, wherein the purchase processing is information processing performed in response to an operation performed by a user to purchase a product or service in accordance with the presentation information outputted.

9. The information processing method according to claim 8, wherein, as a result of determining that the first user does not own the terminal that is capable of the purchase processing, the second user does not match the first user.

10. The information processing method according to claim 1, wherein the appliance is at least one of a light fixture, an air conditioner, a television receiver, an electrical cooking appliance, a washing machine, a cleaner, an electronic lock, and a recorder.

11. An information processing device, comprising:

a processor; and a memory storing a program, wherein the program, when executed by the processor, causes the processor to perform:

obtaining log information indicating an operation performed by an appliance;

obtaining:

location information indicating an installation location of the appliance;

user information indicating a first user linked to the installation location; and receiver information indicating a second user that receives presentation information, wherein the appliance is used by or provided for the first user, the first user owns or does not own a terminal capable of performing purchase processing, which is information processing for purchasing a product or service, and wherein the second user owns a terminal capable of performing the purchase processing;

detecting a change in a state of the first user by reference to the log information; and determining, when the change in the state of the first user by reference to the log information is detected, whether or not the first user matches the second user;

when it is determined that the first user matches the second user,
  determining, as the presentation information, first presentation information to be presented to the first user in accordance with the change in the state, and
  outputting the first presentation information by transmitting the first presentation information to the terminal of the first user who is determined to match the second user, wherein the first presentation information includes a content that is previously associated with the change in the state and includes information encouraging the first user to purchase a product or service to be provided for the first user, when it is determined that the first user does not match the second user,
  determining, as the presentation information, second determines the presentation information to be presented to the second user in accordance with the change in the state, and
  outputting the second presentation information by transmitting the second presentation information to the terminal of the second user without transmitting the determined presentation information to the first user, wherein the second presentation information includes a content that is previously associated with the change in the state and includes information encouraging the second user to purchase a product or service to be provided for the first user, wherein the product or the service is previously associated with the change in the state as a product or service that is provided in response to the state of the first user, and the appliance is installed and used in the installation location.

12. A non-transitory computer readable recording medium storing a program causing a computer to execute the information processing method according to claim 1.

* * * * *